United States Patent Office 3,117,979
Patented Jan. 14, 1964

3,117,979
ESTERS OF 10β-SUBSTITUTED 4,5-SECO-Δ⁹⁽¹¹⁾-19-NOR-ANDROSTENE-17β-OL-3,5-DIONES, INTERMEDIATES AND PROCESS
Gerard Nominé, Noisy-le-Sec, Robert Bucourt, Villiers-le-Bel, and Jean Tessier, Paris, France, assignors, by mesne assignments, to Roussel-Uclaf, S.A., Paris, France, a corporation of France
No Drawing. Filed Jan. 18, 1961, Ser. No. 83,381
Claims priority, application France Jan. 22, 1960
13 Claims. (Cl. 260—340.9)

The present invention relates to a process of alkylation of intermediates in the synthesis of steroid compounds. The invention more particularly relates to a process of introduction of lower alkyls or lower alkenyls in the 10β-position of 17β-acyloxy-19-nor-4,5-seco-Δ⁹⁽¹⁰⁾-androstene-3,5-dione compounds of the Formula I:

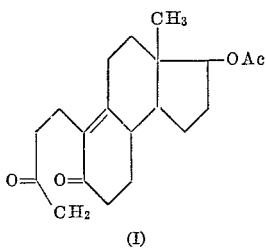

(I)

in which Ac represents the acyl radical of an organic carboxylic acid having from 1 to 18 carbon atoms; and to the intermediate and final products produced by the process.

In copending, commonly-assigned U.S. patent application Serial No. 36,171, filed June 15, 1960, now U.S. Patent No. 3,019,252, there is described the preparation by total synthesis of compounds of Formula I, which products serve as intermediates in the preparation of 19-nor-testosterone and its esters (as described in copending, commonly-assigned U.S. patent application Serial No. 36,172, filed June 15, 1960, now abandoned).

The object of the present invention is the realization of a process of preparation of testosterone and its 10β-derivatives starting from the tricyclic compounds of Formula I.

Another object of the invention is to realize a method of access to the cortisonic steroids starting from compounds of Formula I above indicated.

A still further object of the invention is to furnish a process of preparation of new steroid compounds having in the 10β-position an alkyl radical other than methyl.

Another object of the invention is to develop a process of producing alkyl or alkenyl derivatives in the 10β-position of 17β-acyloxy-19-nor-4,5-seco-Δ⁹⁽¹⁰⁾-androstene-3,5-diones.

A further object of the invention is the obtention of compounds of the general structural formula

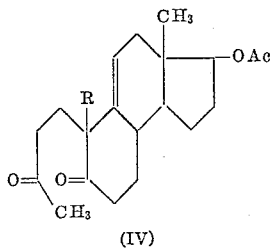

(IV)

wherein Ac represents the acyl radical of an organic carboxylic acid having from 1 to 18 carbon atoms and R is a radical selected from the group consisting of lower alkyl and lower alkenyl, particularly 17β-benzoyloxy-4,5-seco-Δ⁹⁽¹¹⁾-androstene-3,5-dione and 17β-benzoyloxy-10β-allyl-19-nor-4,5-seco-Δ⁹⁽¹¹⁾-androstene-3,5-dione.

A still further object of the invention is the obtention of novel intermediates:

(a) The 3-monoketals of 17β-acyloxy-19-nor-4,5-seco-Δ⁹⁽¹⁰⁾-androstene-3,5-diones and particularly 3-ethylenedioxy-17β-benzoyloxy-19-nor-4,5-seco-Δ⁹⁽¹⁰⁾-androstene-5-one;

(b) The 3-monoketals of 17β-acyloxy-10β-aliphatic lower hydrocarbon radical-19-nor-4,5-seco-Δ⁹⁽¹¹⁾-androstene-3,5-diones and particularly 3-ethylenedioxy-17β-benzoyloxy-4,5-seco-Δ⁹⁽¹¹⁾-androstene-5-one and 3-ethylenedioxy-17β-benzoyloxy-10β-allyl-19-nor-4,5-seco-Δ⁹⁽¹¹⁾-androstene-5-one.

These and other objects of the invention will become more apparent as the description thereof proceeds.

These various objects can be realized by a process of alkylation of compounds of Formula I.

We have found that by the process of alkylation hereinafter described novel industrial products of the general structural Formula IV can be produced:

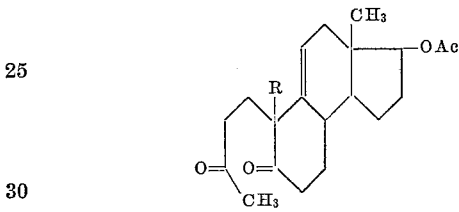

wherein Ac represents the acyl radical of an organic carboxylic acid having from 1 to 18 carbon atoms and R is a radical selected from the group consisting of lower alkyl and lower alkenyl.

The compounds of Formula IV are useful as intermediate products for the synthesis of steroids and, particularly, as precursors for ordinary steroids in the case where they have a methyl group in the 10β-position (R=CH₃) or in addition, as precursors of new steroids carrying in the 10β-position a lower alkyl other than the methyl group, for example the ethyl, propyl or a lower alkenyl, for example the allyl group.

The 10β-lower alkyl or 10β-lower alkenyl 19-nor steroids have steroidal properties similar to the parent 10β-methyl steroids and are produced in the same manner.

We have found that if one proceeded to effect a preliminary blockage of the ketone in the 3-position of compounds of Formula I, it was possible then to alkylate these mono-substituted derivatives in a stereoselective manner to give a substitution in the 10β-position.

The process, the object of the invention, of which the reaction scheme of Table I shows a resume of the reactions, consists essentially in blocking the ketone in the 3-position of the tricyclic compounds of Formula I in the form of a ketal and subjecting the ketalized products to an alkylation. After hydrolysis of the ketal in the 3-position, the 10β-alkyl or 10β-alkenyl-19-nor-9,11-dehydro compounds of Formula IV are obtained.

TABLE I

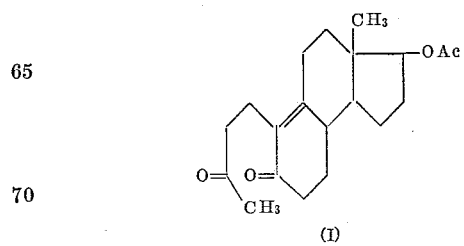

(I)

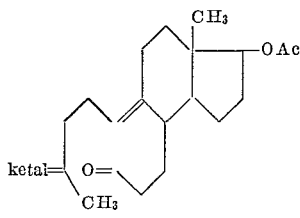

(II)

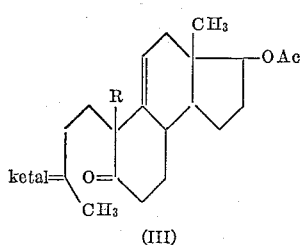

(III)

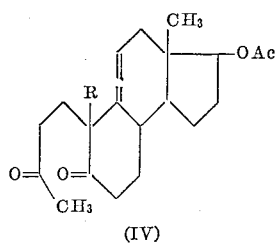

(IV)

wherein:

Ac represents the acyl radical of an organic carboxylic acid having from 1 to 18 carbon atoms;
R represents a lower alkyl or a lower alkenyl radical.

Among the monoketals used for blocking the ketone in the 3-position, it is advantageous to choose ethylene ketal, which is introduced by the usual processes such as by action of ethylene glycol or 2-methyl-2-ethyl-1,3-dioxolane in the presence of a strong organic acid such as p-toluene sulfonic acid. Other ketal-forming compounds may be employed, however. The reaction takes place in an inert organic solvent such as benzene at temperatures up to the reflux temperature.

The introduction of the alkyl or alkenyl group is effected by action of an alkyl halide or an alkenyl halide, preferably the iodide or bromide, in the presence of an alkali metal tertiary lower alkanolate such as sodium tertiary alkanolate. The reaction takes place in an inert organic solvent such as toluene at temperatures up to the reflux temperature.

Hydrolysis of the alkylated monoketal is carried out under customary procedures such as treatment with an aqueous organic acid, for example aqueous acetic acid at elevated temperatures.

Within the scope of the above general definition, the process of the invention is advantageously executed by using as the starting compound of Formula I 17β-benzoyloxy-19-nor-4,5-seco-Δ$^{9(10)}$-androstene-3,5-dione (compound I wherein Ac=C$_6$H$_5$CO). However, other esters of organic carboxylic acids having from 1 to 18 carbon atoms, such as the alkanoates and alkenoates, for example, the acetate, the trimethylacetate, the propionate, the 4,4-dimethyl-pentanoate, the 10-undecenoate; the cycloalkyl-alkanoates, for example, the β-cyclopentyl-propionate; the arylalkanoates, for example, the phenyl-propionate; the cycloalkanoates, for example, the hexahydrobenzoate, the hexahydroterephthalate, and other phenyl-carboxylic acids, 3,5-dinitrobenzoate, may also be used without departing from the scope of the invention.

The invention extends to the application of compounds of Formula IV to the preparation of the 9,11-dehydrotestosterone or its higher homologs and analogs (10β-lower hydrocarbon radical-19-nor). The 9,11-dehydrotestosterone can serve equally either in the synthesis of 9α-fluoro-11β-hydroxy testosterone or the synthesis of testosterone itself. The 10β-lower hydrocarbyl-19-nor analogs of testosterone derivatives have pharmacodynamic activity similar to the parent testosterone.

The preparation of 9,11-dehydrotestosterone, or of its higher homologs and analogs (10β-lower hydrocarbon radical-19-nor) according to the invention consists essentially in cyclizing the compounds IV by the action of an alkaline base.

This cyclization can be advantageously effected by the use, as alkaline base, of potassium hydroxide in solution in methanol.

The invention extends equally to the application of the compounds of Formula IV in the preparation of cortisonic steroids going through 9,11-dehydrotestosterone.

The following examples are given as purely illustrative in order to enable a better comprehension of the invention. They are not to be construed as limiting the invention in any respect.

The temperatures are indicated in degrees centigrade.

*Example I*

PREPARATION OF 17β-BENZOYLOXY-4,5-SECO-Δ$^{9(11)}$-ANDROSTENE-3,5-DIONE, IV (R$_1$=CH$_3$)

(a) *Ketalization.*—705 mg. of 17β-benzoyloxy-19-nor-4,5-seco-Δ$^{9(10)}$-androstene-3,5-dione, I (Ac=COC$_6$H$_5$), obtained according to United States Patent No. 3,019,252, were dissolved in 7 cc. of anhydrous benzene and 7 cc. of 2-methyl-2-ethyl-1,3-dioxolane. 14 mg. of p-toluene sulfonic acid monohydrate were added to the solution thus formed and the reaction mixture was heated to reflux for ten minutes. After cooling, the reaction mixture was poured into a solution of sodium bicarbonate under agitation. The organic layer was separated, dried over potassium carbonate, filtered and evaporated to dryness. The residue was redissolved in ether and 797 mg. of a yellow oil of the ethylene monoketal, 3-ethylenedioxy-17β-benzoyloxy-19-nor-4,5-seco-Δ$^{9(10)}$-androstene-5-one, II, Ac=C$_6$H$_5$CO, were obtained which were used without further purification for the following stage of the synthesis. This compound had a specific rotation [α]$_D^{20}$=+47°±2 (c.=1.3% in ethanol).

The product was soluble in ether, acetone, benzene, chloroform and alcohol and insoluble in water. It was decomposed by the action of dilute aqueous acids.

This product is not described in the literature.

(b) *Alkylation.*—788 mg. of the 3-ethylenedioxy-17β-benzoyloxy-19-nor-4,5-seco-Δ$^{9(10)}$-androstene-5-one, II (Ac=C$_6$H$_5$CO) were dissolved in 9.2 cc. of anhydrous toluene; then 0.95 cc. of a toluenic solution of 2.24 N sodium tertiary amylate were added under an atmosphere of nitrogen and under agitation. On heating the mixture to reflux for ten minutes, a yellowish-orange precipitate was formed. 1.005 mg. of methyl iodide in 6 cc. of anhydrous toluene were then added; the sodium derivative disappears, then a new precipitate is formed. After several minutes of refluxing, 20 cc. of ether and 20 cc. of water were added and the organic phase was separated by decantation. The organic phase was dried, filtered and evaporated to dryness.

725 mg. of a yellowish-brown oil were recovered. This product was the ethylene monoketal, 3-ethylenedioxy-17β-benzoyloxy-4,5-seco-Δ$^{9(11)}$-androstene-5-one, III (Ac=C$_6$H$_5$CO, R=CH$_3$). The product was used as such for the next step of the synthesis. It was soluble in alcohol, ether, acetone, benzene and chloroform, insoluble in water and was decomposed by the action of dilute aqueous acids.

This product is not described in the literature.

(c) *Hydrolysis.*—720 mg. of the raw 3-ethylenedioxy-17β-benzoyloxy-4,5-seco-Δ$^{9(11)}$-androstene-5-one, III, were dissolved in 25 cc. of glacial acetic acid. 17 cc. of water were added and the mixture was heated to 60° C. for one hour. The mixture was then poured into 250 cc. of water containing 40 gm. of sodium bicarbonate. The aqueous solution was extracted with methylene chloride. The extracts were combined, washed with water, dried and evaporated to dryness. Yield: 630 mg. of a yellow oil. This product was the raw methylated compound, 17β-benzoyloxy-4,5-seco-Δ$^{9(11)}$-androstene-3,5-dione, IV (Ac=$C_6H_5CO$, R=$CH_3$). This compound was purified by chromatography on silica gel with elution by a mixture of methylene chloride and acetone (98.2:1.8).

The product was soluble in alcohol, ether, acetone, benzene and chloroform, and insoluble in water.

This product is not described in the literature.

*Example II*

PREPARATION OF 9,11-DEHYDROTESTOSTERONE STARTING FROM COMPOUND IV (R=$CH_3$, Ac=$C_6H_5CO$)

175 mg. of purified 17β-benzoyloxy-4,5-seco-Δ$^{9(11)}$-androstene-3,5-dione, IV (R=$CH_3$, Ac=$C_6H_5CO$) as obtained according to the preceding example were introduced into 17.5 cc. of N/2 methanolic potassium hydroxide. The mixture was heated at reflux for one hour. The mixture was then concentrated and thereafter 20 cc. of water and 20 cc. of ether were added. The ethereal phase was separated, washed until neutral, dried over sodium sulfate, filtered and evaporated to dryness. A yellow oil was recovered which was subject to chromatography on silica gel and elution with a mixture of methylene chloride and acetone as in Example I. 9,11-dehydrotestosterone was recovered, having a melting point of 154° C., identical to the product described by Heyl et al., J. Am. Chem. Soc., 77, 488 (1955).

This product can be hydrogenated by known procedures to give testosterone or it can be reacted according to the known procedures outlined in Table II to give adrenosterone and cortisone.

When the 10β-group is a lower alkyl group other than the methyl group, there may be obtained 10β-lower alkyl-19-nor-adrenosterone and 10β-lower alkyl-19-nor cortisone analogs.

TABLE II

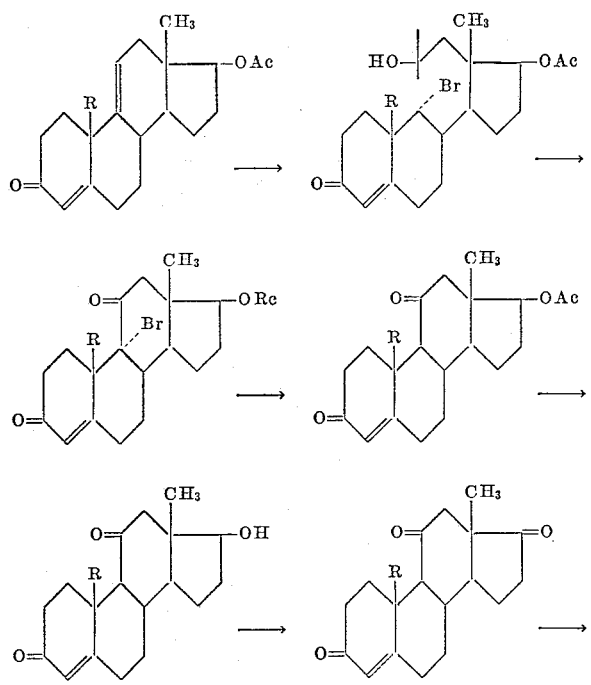

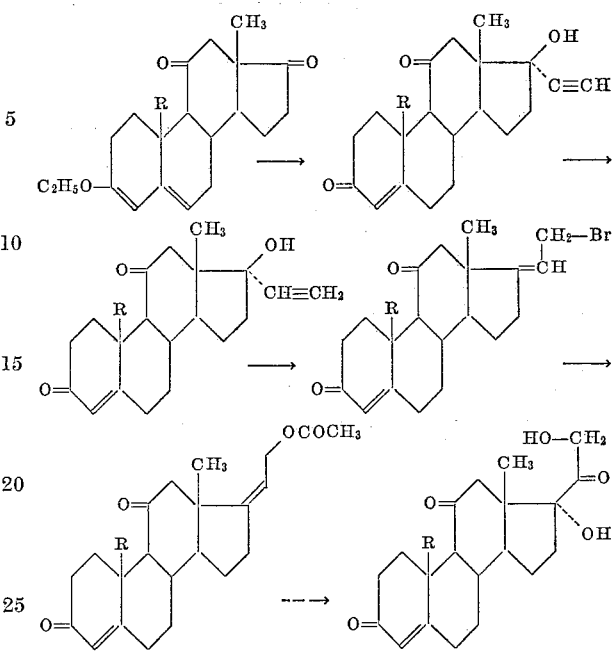

wherein:

Ac represents the acyl radical of an organic carboxylic acid having 1 to 18 carbon atoms;
R represents a lower alkyl or lower alkenyl group.

*Example III*

PREPARATION OF 17β-BENZOYLOXY-4,5-SECO-10β-ALLYL-19-NOR-Δ$^{9(11)}$-ANDROSTENE-3,5-DIONE, IV (R=$CH_2$—CH=$CH_2$, Ac=$C_6H_5CO$)

(a) *Alkylation.*—To 100 mg. of 3-ethylenedioxy-17β-benzoyloxy-19-nor-4,5-seco-Δ$^{9(10)}$-androstene-5-one, II, prepared according to Example I, in solution in 1.5 cc. of toluene, was added 0.25 cc. of a 1.02 N solution of sodium tertiary amylate in toluene. The mixture was heated to reflux for ten minutes. A yellow precipitate was produced. 34 mg. of allyl bromide diluted by 0.6 cc. of toluene were added at reflux temperature over a five minute period. The preceding precipitate was observed to disappear. Refluxing was continued five minutes after the end of the addition of allyl bromide. The mixture was then cooled and taken up in water and ether.

From the organic phase, 99 mg. of yellow resin were isolated. This product was 3-ethylenedioxy-17β-benzoyloxy-4,5-seco-10β-allyl-19-nor-Δ$^{9(11)}$-androstene-5-one, III (R=$CH_2$—CH=$CH_2$).

(b) *Hydrolysis.*—The preceding resin was treated with 1.65 cc. of 60% acetic acid for one hour at 60°, then poured into an excess of aqueous sodium bicarbonate. This produced the diketone, 17β-benzoyloxy-4,5-seco-10β-allyl-19-nor-Δ$^{9(11)}$-androstene-3,5-dione, IV (R=$CH_2$—CH=$CH_2$)

which was isolated by means of extraction with methylene chloride. Yield: 80 mg.

Purification was accomplished by chromatography on silica gel.

25 mg. (31%) of a pale yellow resin were recovered on eluting with methylene chloride containing 1.8% of acetone.

*Infrared spectra.*—Bands at 1635 cm.$^{-1}$, 914 cm.$^{-1}$ and 990 cm.$^{-1}$ corresponding to $CH_2$=CH.

By the process of cyclization given in Example II, 17β-benzoyloxy-4,5-seco-10β-allyl-19-nor-Δ$^{9(11)}$-androstene-3,5-dione can produce 10β-allyl-19-nor-9,11-dehydrotestosterone which compound can be hydrogenated to give 10β-propyl-19-nor-testosterone or, if the double bond of the allyl group is first protected according to methods known to those skilled in the art, reacted to give 10β-allyl-19-nor-andrenosterone and 10β-allyl-19-nor-cortisone. This latter compound as well as other 10β-lower hydrocarbyl-19-nor-cortisone compounds has a cortisonic activity.

It is to be understood that the invention is not limited to the specific examples described above. One can also use equivalent techniques known to the man skilled in the art without departing from the body of the invention. It is obvious that other lower alkyl halides and lower alkenyl halides such as ethyl iodide, butyl bromide, butenyl iodide, etc. can be employed in the alkylation step. Within the scope of the present invention are to be included the process above described of operating on compounds of Formula I wherein Ac=CH₃CH₂CO, C₆H₁₁CO, (NO₂)₂C₆H₃CO, etc.

We claim:

1. A 9,11-dehydro steroid compound of the structural formula

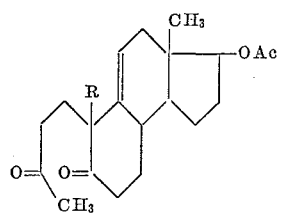

wherein Ac represents the acyl radical of an organic hydrocarbon carboxylic acid having from 1 to 18 carbon atoms and R is a radical selected from the group consisting of lower alkyl and lower alkenyl.

2. 17β-benzoyloxy-4,5-seco-Δ⁹⁽¹¹⁾-androstene-3,5-dione.

3. 17β-benzoyloxy-10β-allyl-19 - nor - 4,5 - seco-Δ⁹⁽¹¹⁾-androstene-3,5-dione.

4. A steroid compound of the structural formula

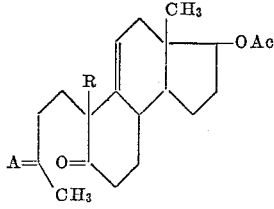

wherein Ac represents the acyl radical of an organic hydrocarbon carboxylic acid having from 1 to 18 carbon atoms, R is a radical selected from the group consisting of lower alkyl and lower alkenyl and A represents ethylenedioxy.

5. 3 - ethylenedioxy - 17β-benzoyloxy - 4,5 - seco-Δ⁹⁽¹¹⁾-androstene-5-one.

6. 3-ethylenedioxy-17β-benzoyloxy-10β - allyl-19-nor-4,5-seco-Δ⁹⁽¹¹⁾-androstene-5-one.

7. A steroid compound of the structural formula

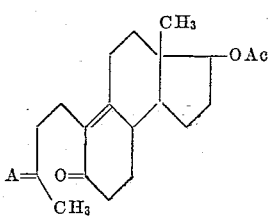

wherein Ac represents the acyl radical of an organic hydrocarbon carboxylic acid having from 1 to 18 carbon atoms and A represents ethylenedioxy.

8. 3-ethylenedioxy - 17β-benzoyloxy-19 - nor-4,5 - seco-Δ⁹⁽¹⁰⁾-androstene-5-one.

9. A process for the production of a 9,11-dehydro steroid compound of the structural formula

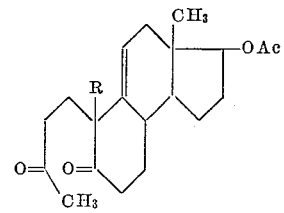

wherein Ac represents the acyl radical of an organic hydrocarbon carboxylic acid having from 1 to 18 carbon atoms and R is a radical selected from the group consisting of lower alkyl and lower alkenyl, which comprises the step of reacting the ketone in the 3-position of a 17β-acyloxy-19-nor-4,5 - seco-Δ⁹⁽¹⁰⁾-androstene-3,5-dione compound of the formula

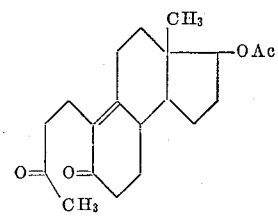

in which Ac has the meaning assigned above, with a compound selected from the group consisting of ethylene glycol and 2-methyl-2-ethyl-1,3-dioxolane in the presence of a strong organic acid, subjecting the resulting 3-ketal to a reaction with an alkylation agent selected from the group consisting of lower alkyl halides and lower alkenyl halides in the presence of an alkali metal tertiary lower alkanoate, hydrolyzing the ketal group in the 3-position by the action of an aqueous organic acid and recovering said 9,11-dehydro steroid compound.

10. The process of claim 9 wherein Ac represents benzoyl.

11. The process of producing 17β-benzoyloxy-4,5-seco-Δ⁹⁽¹¹⁾-androstene-3,5-dione which comprises the step of reacting 17β-benzoyloxy-19 - nor-4,5 - seco-Δ⁹⁽¹⁰⁾-androstene-3,5-dione with a compound selected from the group consisting of ethylene glycol and 2-methyl-2-ethyl-1,3-dioxolane in the presence of a strong organic acid, subjecting the 3-ethylenedioxy-17β-benzoyloxy-19-nor-4,5-seco-Δ⁹⁽¹⁰⁾-androstene-5-one to the action of methyl iodide in the presence of sodium tertiary amylate, hydrolyzing the 3-ethylenedioxy-17β-benzoyloxy-4,5-seco-Δ⁹⁽¹¹⁾-androstene-5-one with aqueous acetic acid and recovering said 17β-benzoyloxy-4,5-seco-Δ⁹⁽¹¹⁾-androstene-3,5-dione.

12. The process of producing 17β-benzoyloxy-10β-allyl-19-nor-4,5 - seco-Δ⁹⁽¹¹⁾-androstene - 3,5-dione which comprises the step of reacting 17β-benzoyloxy-19-nor-4,5-seco-Δ⁹⁽¹⁰⁾-androstene-3,5-dione with a compound selected from the group consisting of ethylene glycol and 2-methyl-2-ethyl-1,3-dioxolane in the presence of a strong organic acid, subjecting the 3-ethylenedioxy-17β-benzoyloxy-19-nor-4,5-seco-Δ⁹⁽¹⁰⁾-androstene-5-one to the action of allyl bromide in the presence of sodium tertiary amylate, hydrolyzing the 3-ethylenedioxy-17β-benzoyloxy-10β-allyl-19-nor-4,5-seco-Δ⁹⁽¹¹⁾ - androstene-5-one with aqueous acetic acid and recovering said 17β-benzoyloxy-10β-allyl-19-nor-4,5-seco-Δ⁹⁽¹¹⁾ - androstene-3,5-dione.

13. A process of producing a 9,11-dehydrotestosterone of the structural formula

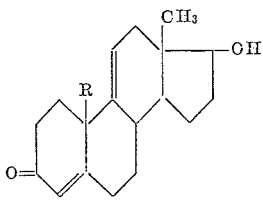

wherein R is a radical selected from the group consisting of lower alkyl and lower alkenyl, which comprises the step of cyclizing a 9,11-dehydro steroid intermediate of the structural formula

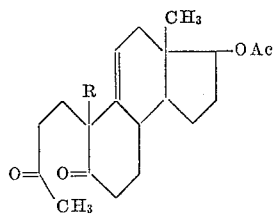

wherein Ac represents the acyl radical of an organic hydrocarbon carboxylic acid having from 1 to 18 carbon atoms and R has the above-assigned meaning, by means of a reaction with potassium hydroxide in solution in methanol and recovering said 9,11-dehydrotestosterone.

References Cited in the file of this patent
UNITED STATES PATENTS 2,839,537   Miesher et al. _____ June 17, 1958
2,957,888   Wettstein et al. _____ Oct. 25, 1960

OTHER REFERENCES

Velluz et al.: "Angew. Chem.," 72, 725–730 (1960).